United States Patent

Siraky

[11] Patent Number: 6,124,654
[45] Date of Patent: Sep. 26, 2000

[54] DRIVE SYSTEM

[75] Inventor: Josef Siraky, Donaueschingen, Germany

[73] Assignee: Max Stegmann GmbH Antriebstechnik-Eledtronik

[21] Appl. No.: 09/158,676

[22] Filed: Sep. 22, 1998

[30] Foreign Application Priority Data

Sep. 27, 1997 [DE] Germany .............. 197 42 800

[51] Int. Cl.$^7$ .................................................. H02K 7/00
[52] U.S. Cl. .................... 310/67 R; 310/68 R; 310/68 B
[58] Field of Search ............... 310/67 R, 68 B, 310/68 R, 168

[56] References Cited

U.S. PATENT DOCUMENTS

| | | | |
|---|---|---|---|
| 2,978,901 | 4/1961 | Sundberg | 73/862.17 |
| 3,657,923 | 4/1972 | Wildi | 73/862.17 |
| 3,831,073 | 8/1974 | Tanikoshi | 318/254 |
| 3,868,521 | 2/1975 | Schlicker et al. | 310/257 |
| 4,406,983 | 9/1983 | Ramirez | 318/653 |
| 4,541,603 | 9/1985 | Hayashi | 248/679 |
| 4,942,343 | 7/1990 | Orlicki et al. | 318/6 |
| 4,962,331 | 10/1990 | Smith | 310/261 |
| 5,506,502 | 4/1996 | Maennle | 324/207.25 |
| 5,717,268 | 2/1998 | Carrier et al. | 310/156 |
| 5,744,706 | 4/1998 | Siraky | 73/116 |
| 5,808,185 | 9/1998 | Siraky | 73/116 |

FOREIGN PATENT DOCUMENTS

| | | |
|---|---|---|
| 3418114 C2 | of 0000 | Germany . |
| 44 34 577 A1 | 4/1996 | Germany . |
| 95 21 845 A1 | 12/1996 | Germany . |

*Primary Examiner*—Elvin Enad
*Assistant Examiner*—Joseph Waks
*Attorney, Agent, or Firm*—Foley, Hoag & Eliot, LLP

[57] ABSTRACT

A drive system is described that uses an electric motor and a rotary angle measuring system. The measuring system shaft is supported in roller bearings in a stator which is supported relative to the electric motor in a nonrotatable fashion by means of a stator coupling. The measuring system shaft is rigidly mounted on the end of motor shaft. The rotary angle measuring system thus assumes support of motor shaft at the B end.

13 Claims, 2 Drawing Sheets

DRIVE SYSTEM

BACKGROUND OF THE INVENTION

1. Field of the Invention

This invention relates to a drive system and more particularly to measuring the rotational angle of a drive system.

2. Description of Related Art

Drive systems such as those used, for example, as servo motors, consist of an electric motor and a rotational angle measuring system coupled to the electric motor which measures values such as the angular position, the rpm, and/or the rotary acceleration to regulate the electric motor. The electric motor may consist of a rotor, a stator, and windings. The motor shaft may be mounted at each end of the motor in a roller bearing. The roller bearing that supports the drive shaft is usually referred to as the A bearing, while the roller bearing that supports the opposite end is termed the B bearing. Rotary angle measuring systems have a measuring system shaft that is coupled non-rotatably with the motor shaft and has an angular measure. A stator of the rotary angle measuring system includes a scanner that scans the angular measure. The stator of the rotary angle measuring system is supported non-rotatably by a stator coupling relative to the stator of the electric motor.

In known drive systems (for example DE 44 46 243 C1, DE 33 01 205 C2, GB 2 117 572 A) the measuring system shaft of the rotary angle measuring system is supported in at least one roller bearing of the stator of the rotary angle measuring system. The measuring system shaft is coupled rigidly with the motor shaft. The radial and axial movements of the motor shaft are consequently transferred to the measuring system shaft. Errors in axial alignment between the motor shaft and the measuring system shaft produce wobbling movements of the measuring system shaft. The stator of the rotary angle measuring system that is mounted on the measuring system shaft by means of the roller bearings must follow all of these movements. The stator coupling must therefore be flexible both axially and radially, but must support the stator of the rotary angle measuring system without twisting.

It is desirable to provide a drive system that does not exhibit all of the problems described above and that can be manufactured economically and take up little space.

SUMMARY OF THE INVENTION

According to the present invention, the B bearing that supports the end of the motor shaft facing the rotary angle measuring system is replaced by the rotary angle measuring system itself. The rotary angle measuring system thus assumes support of the motor shaft at the B end. The elimination of the B bearing reduces the number of parts required and consequently results in a saving in manufacturing cost. In addition, the space required for the B bearing is eliminated as well, so that the rotary angle measuring system can be mounted closer axially to the electric motor and the axial length of the drive system can be reduced. The stator coupling can likewise be simplified, since it is required to follow only the axial movements of the motor shaft and the measuring system shaft rigidly coupled therewith, and must accept the wobbling movements of the measuring system shaft coupled to the motor shaft that are caused by errors in alignment. Since the stator of the rotary angle measuring system now supports the motor shaft, the stator coupling must not allow any radial movements.

BRIEF DESCRIPTION OF DRAWINGS

The invention is explained in greater detail below by reference to an exemplary embodiment shown in the drawings, in which.

DETAILED DESCRIPTION OF THE PREFERRED EMBODIMENT(S)

Figure 1:
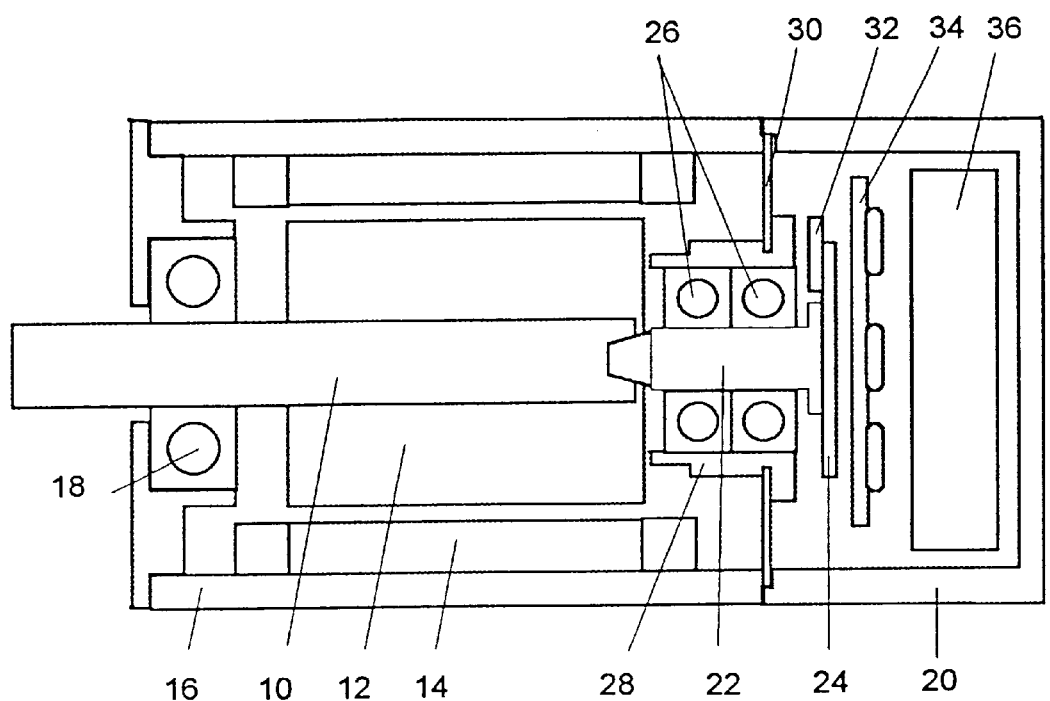
FIG. 1 is an axial section that illustrates a drive system according to the present invention.

FIG. 1 shows, in schematic form, a drive system that consists of an electric motor and a rotary angle measuring system.

The electric motor has a motor shaft 10 with a rotor 12 as well as a stator 14 with windings, which is enclosed in a motor housing 16. The motor shaft 10 is supported at a drive end thereof in a roller bearing 18, the so-called A bearing, in the motor housing 16.

A rotary angle measuring system is mounted at the end of the electric motor that is opposite the drive side (i.e., the A bearing side). The rotary angle measuring system has a measuring system housing 20 mounted on the motor housing 16. The rotary angle measuring system also has a measuring system shaft 22 that is mounted axially with, and rigidly connected to, the end of the motor shaft 10. The measuring system shaft 22 has a disk 24 at the end facing away from motor shaft 10. The disk 24 caries an angle-measuring indication, for example an optical angle-measuring indication. A stator 28 is mounted on the measuring system shaft 22 in two roller bearings 26. The stator 28 is connected with the motor housing 16 and the measuring system housing 20 by a stator coupling 30. The stator coupling 30 allows axial movements and wobbling movements of the stator 28 relative to the housings 16, 20, but supports the stator 28 nonrotatably on the housings 16, 20. The stator coupling 30 is designed, for example as a concentric spring steel circular ring disk which allows elastic flexing in axial directions but does not allow any radial movements and especially no twisting movements.

The stator coupling 30 supports the stator 28 of the rotary angle measuring system radially, so that the stator 28 supports the measuring system shaft 22 radially in the roller bearing 26. Since the measuring system shaft 22 is rigidly coupled with the motor shaft 10, then both the measuring system shaft 22 and the end of motor shaft 10 coupled thereto are supported radially by the stator coupling 30, the stator 28, and the roller bearings 26.

The stator 28 supports a scanner 32 for accessing the angle-measuring indicator of the disk 24. In addition, a board 34 is located in the measuring system housing 20 for the electric components of the scanner 32. An amplifier and regulator module 36 can likewise be accommodated in the measuring system housing 20, so that a complete feedback system for regulating the drive of the electric motor is accommodated inside the housing.

Figure 2:
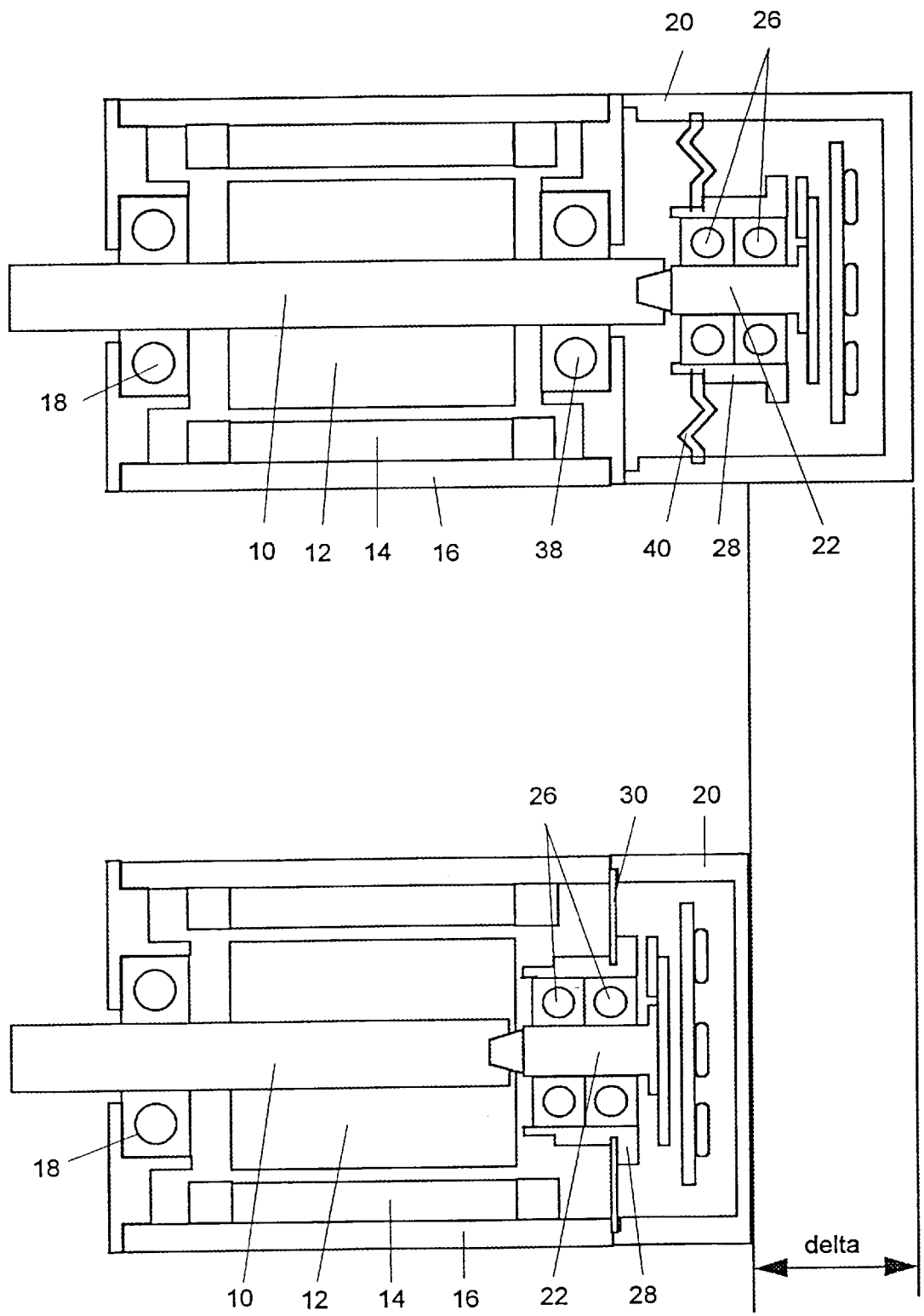
FIG. 2 is a comparison between the drive system according to the present invention and a drive system according to the prior art.

In FIG. 2, to emphasize the advantages according to the invention, a drive system according to the prior art is compared with the drive system according to the present invention.

The drive system shown at the top in FIG. 2 corresponds to the known drive system according to DE 44 46 243 C1. In this known drive system, the end of motor shaft 10 that faces the rotary angle measuring system is supported in a roller bearing 38, the so-called B bearing, located in the motor housing. A stator coupling 40 is required to accept not only axial movements and wobbling movements but also radial movements that can result from an axial offset between the motor and the rotary angle measuring system.

At the bottom of FIG. 2, a drive system is shown that corresponds to the drive system in FIG. 1 except that the amplifier and regulator module 36 are not shown. The arrow marked "delta" indicates a reduction of the axial length that may be achieved by the invention.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. Drive system, comprising:

an electric motor having a stator and a motor shaft with two ends, with a first end of the motor shaft supported in a first roller bearing disposed at one end of the motor; and a rotary angle measuring system having a measuring system shaft supported in at least one second roller bearing, said measuring system shaft being separate from said motor shaft and rigidly coupled with a second end of the motor shaft, and having a measuring system stator supported by a stator coupling which allows axial movement between the measuring system stator and the stator of the electric motor during operation while preventing rotation therebetween.

2. Drive system according to claim 1, wherein the stator coupling is a spring steel circular ring disk.

3. The drive system of claim 1, wherein the electric motor is an inner rotor motor.

4. A drive assembly, comprising:

a housing;

a motor shaft disposed within said housing;

a first set of bearings disposed in the housing at one end of said motor shaft;

a second set of bearings disposed in the housing distal from said first set of bearings;

a rotary angle measuring system having a stator which is non-rotatably secured to the housing and a measuring system shaft disposed for rotation in said second set of bearings, wherein an other end of said motor shaft is non-rotatably supported by said measuring system shaft.

5. The drive assembly, according to claim 4, wherein the stator is non-rotatably secured to the housing by a stator coupling, said stator coupling allowing for axial movement of said stator during operation while substantially inhibiting radial movement of said stator.

6. The drive assembly, according to claim 4, further comprising:

a disk, coupled to said measuring system shaft, said disk having an angle-measuring indicator thereon.

7. The drive assembly, according to claim 6, wherein said angle-measuring indicator is an optical angle-measuring indicator.

8. The drive assembly, according to claim 7, further comprising:

a scanner, for accessing said angle-measuring indicator.

9. The drive assembly, according to claim 8, further comprising:

a board, operatively coupled to said scanner and having electronic components therefor.

10. A drive assembly, comprising:

a housing;

a motor shaft disposed within said housing;

motor shaft support means for supporting one end of said motor shaft;

rotary angle measuring means having a measuring shaft and measuring shaft support means, said measuring shaft support means disposed distal from another end of said motor shaft, for supporting said measuring shaft; and a stator disposed about said second measuring shaft support means and stator coupling means for flexibly coupling said stator to said housing for relative axial movement between the stator and the housing during operation, wherein the measuring shaft non-rotatably supports the other end of the motor shaft so that the rotary angle measuring means measures a rotary angle of said motor shaft.

11. The A drive assembly, according to claim 10, further comprising:

a disk, coupled to said measuring shaft, said disk having an angle-measuring indicator thereon, wherein said angle-measuring indicator is an optical angle-measuring indicator.

12. The A drive assembly, according to claim 11, further comprising:

a scanner, for accessing said angle-measuring indicator; and a board, operatively coupled to said scanner and having electronic components therefor.

13. The A drive assembly, according to claim 10, wherein said motor shaft support means and said measuring shaft support means are roller bearings.

* * * * *